United States Patent
Shiraishi et al.

(10) Patent No.: US 8,976,425 B2
(45) Date of Patent: *Mar. 10, 2015

(54) IMAGE SCANNING APPARATUS AND IMAGE FORMING APPARATUS

(75) Inventors: Hiroyuki Shiraishi, Shizuoka-ken (JP); Naoaki Ide, Shizuoka-ken (JP); Mitsuru Hatano, Kanagawa-ken (JP); Sueo Ueno, Shizuoka-ken (JP); Katsuya Nagamochi, Tokyo (JP); Yusuke Hashizume, Chiba-ken (JP); Naoya Koseki, Shizuoka-ken (JP); Koji Shimokawa, Shizuoka-ken (JP); Jun Sakakibara, Tokyo (JP); Kenji Itagaki, Shizuoka-ken (JP); Sasuke Endo, Kanagawa-ken (JP)

(73) Assignee: Toshiba TEC Kabushiki Kaisha, Tokyo (JP)

(*) Notice: Subject to any disclaimer, the term of this patent is extended or adjusted under 35 U.S.C. 154(b) by 718 days.

This patent is subject to a terminal disclaimer.

(21) Appl. No.: 13/110,689

(22) Filed: May 18, 2011

(65) Prior Publication Data

US 2011/0286053 A1 Nov. 24, 2011

Related U.S. Application Data

(60) Provisional application No. 61/346,370, filed on May 19, 2010, provisional application No. 61/346,371, filed on May 19, 2010, provisional application No. 61/346,375, filed on May 19, 2010, provisional application No. 61/346,366, filed on May 19, 2010, (Continued)

(51) Int. Cl.
*H04N 1/04* (2006.01)
*H04N 1/46* (2006.01)

(Continued)

(52) U.S. Cl.
CPC ......... *H04N 1/0285* (2013.01); *H04N 1/02865* (2013.01); *H04N 1/02885* (2013.01); *H04N 1/1013* (2013.01); *H04N 2201/0094* (2013.01)
USPC .......................................... 358/475; 358/509

(58) Field of Classification Search
USPC ......... 358/475, 483, 482, 484, 474, 509, 505; 399/220, 221; 355/37–70; 250/205, 250/227.21, 234–236, 203.2, 578.1; 362/800
See application file for complete search history.

(56) References Cited

U.S. PATENT DOCUMENTS 8,081,355 B2 * 12/2011 Nishina et al. ................ 358/474
8,228,568 B2 * 7/2012 Yoshimoto et al. .......... 358/475

(Continued)

FOREIGN PATENT DOCUMENTS

JP  2008-177918      7/2008
JP  2008177918 A  *  7/2008
JP  2010026289 A  *  2/2010

*Primary Examiner* — Cheukfan Lee
(74) *Attorney, Agent, or Firm* — Patterson & Sheridan LLP

(57) ABSTRACT

According to one embodiment, an image scanning apparatus includes a document table on which an original document is stacked; a substrate; plural first light emitting elements located on one surface of the substrate, the first light emitting elements each emitting light for irradiating the original document on the document table with direct light not reflected by a reflection member; and plural second light emitting elements located on the other surface of the substrate, the second light emitting elements each emitting light for irradiating the original document on the document table with indirect light reflected by the reflection member. The reflection member includes a first reflection member and a second reflection member, and the first reflection member and the second reflection member are located in positions opposed to each other across a reflection optical path of light reflected by the original document on the document table.

16 Claims, 12 Drawing Sheets

Related U.S. Application Data provisional application No. 61/346,384, filed on May 19, 2010, provisional application No. 61/346,418, filed on May 19, 2010.

(51) Int. Cl.
*H04N 1/028* (2006.01)
*H04N 1/10* (2006.01)

(56) References Cited

U.S. PATENT DOCUMENTS

| | | | |
|---|---|---|---|
| 8,508,814 B2* | 8/2013 | Tanaka | 358/482 |
| 2009/0284967 A1* | 11/2009 | Maruyama | 362/234 |
| 2011/0286057 A1* | 11/2011 | Nagamochi et al. | 358/484 |
| 2012/0002253 A1* | 1/2012 | Nagamochi et al. | 358/509 |

* cited by examiner

US 8,976,425 B2

IMAGE SCANNING APPARATUS AND IMAGE FORMING APPARATUS

CROSS-REFERENCE TO RELATED APPLICATIONS

This application is based upon and claims the benefit of priority from: U.S. provisional application 61/346,370, filed on May 19, 2010; U.S. provisional application 61/346,371, filed on May 19, 2010; U.S. provisional application 61/346,375, filed on May 19, 2010; U.S. provisional application 61/346,366, filed on May 19, 2010; U.S. provisional application 61/346,384, filed on May 19, 2010; and U.S. provisional application 61/346,418, filed on May 19, 2010; the entire contents all of which are incorporated herein by reference.

FIELD

Embodiments described herein relate generally to a technique related to the structure of an image scanning apparatus.

BACKGROUND

An LED array is used as a light source of an image scanning apparatus. However, if one LED array irradiates a document surface, since irradiation width on the document surface is narrow, a shadow of an image tends to appear when a level difference portion of an original document is scanned. Since a light amount of the one LED array is small, if a more light amount is necessary, a method of increasing a current value or changing LEDs to high-power LEDs to increase the light amount is adopted. However, in such a method, a ripple of illuminance tends to occur on the document surface. Therefore, it is conceivable to increase the irradiation width and increase the light amount by using two LED arrays.

The LED arrays are mounted on a component surface of a substrate. However, it is likely that, if LEDs are kept on for a long time, a temperature difference occurs between the component surface and a solder surface of the substrate because of a temperature rise of the LEDs alone and the substrate warps. If the substrate warps, an illuminance characteristic of the document surface is adversely affected.

DETAILED DESCRIPTION

In general, according to one embodiment, an image scanning apparatus includes: a document table on which an original document is stacked; a substrate; plural first light emitting elements located on one surface of the substrate, the first light emitting elements each emitting light for irradiating the original document on the document table; and plural second light emitting elements located on the other surface of the substrate, the second light emitting elements each emitting light for irradiating the original document on the document table.

In general, according to another embodiment, an image forming apparatus includes: an image scanning section including: a document table on which an original document is stacked; a substrate; plural first light emitting elements located on one surface of the substrate, the first light emitting elements each emitting light for irradiating the original document on the document table; and plural second light emitting elements located on the other surface of the substrate, the second light emitting elements each emitting light for irradiating the original document on the document table; and an image forming section configured to form an image on a sheet on the basis of image data scanned by the image scanning section.

First Embodiment

Figure 1:
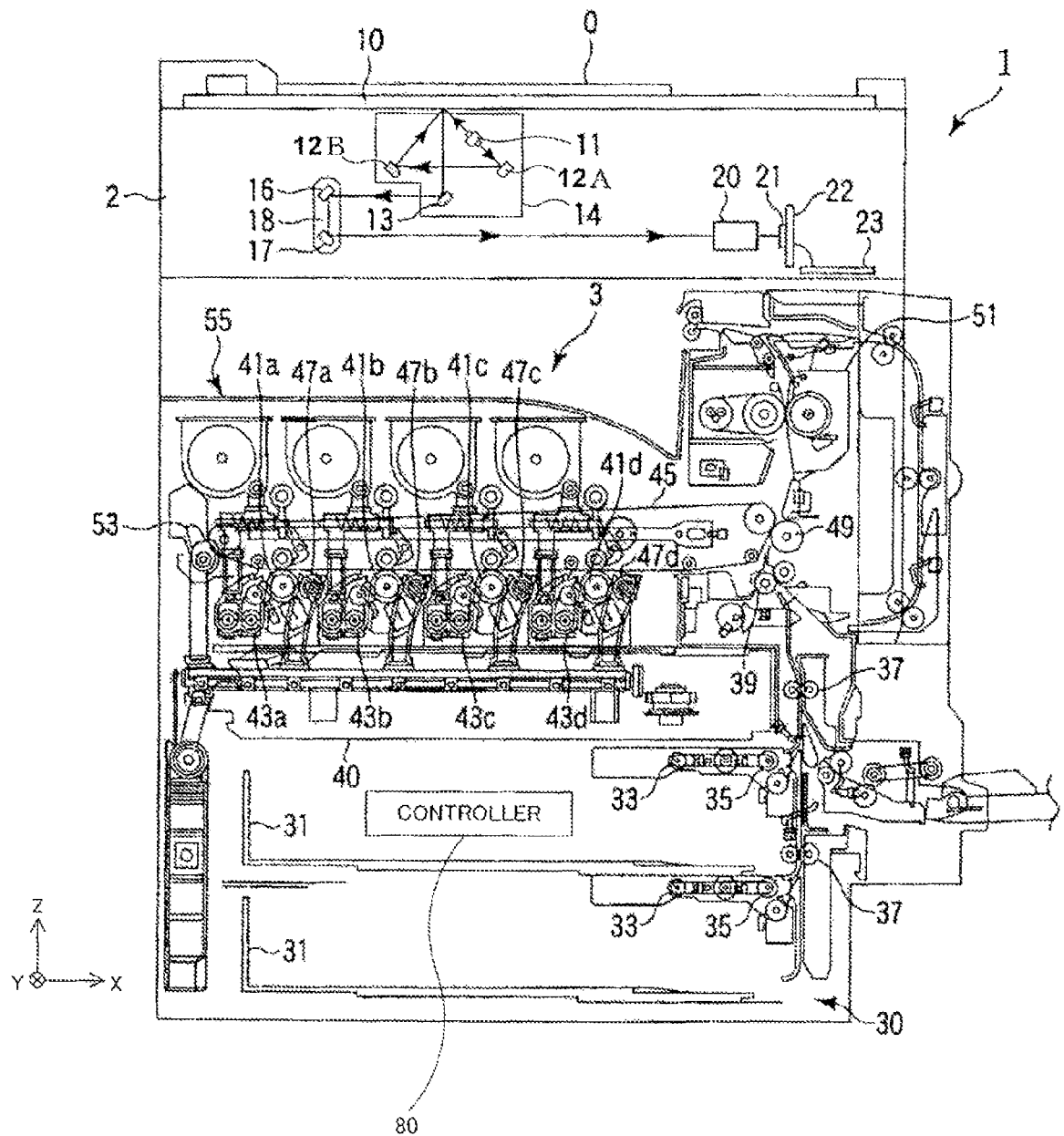
FIG. 1 is a sectional view of the internal configuration of a color digital multifunction peripheral.

An image scanning apparatus according to a first embodiment is explained in detail below with reference to the accompanying drawings. FIG. 1 is a sectional view of the internal configuration of a color digital multifunction peripheral (image forming apparatus) 1 incorporating an image scanning apparatus according to this embodiment.

The digital multifunction peripheral 1 shown in FIG. 1 includes an image scanning apparatus 2 and an image forming section 3. An X axis, a Y axis, and a Z axis are three different axes orthogonal to one another. The X axis corresponds to a sub-scanning direction of the image scanning apparatus 2. The image scanning apparatus 2 optically scans a document surface to thereby read an image on an original document as color image data (multi-value image data). The image forming section 3 forms an image based on the color image data (the multi-value image data). The digital multifunction peripheral 1 further includes, as means for inputting and outputting image data, a facsimile interface (not shown) for transmitting and receiving facsimile data or a network interface (not shown) for performing network communication. The digital multifunction peripheral 1 functions as a copying machine, a scanner, a printer, a facsimile, or a network communication machine. The digital multifunction peripheral 1 includes a controller 80. The controller 80 manages control of the entire digital multifunction peripheral 1. The controller 80 may be a CPU or an MPU. The controller 80 may be an ASIC circuit configured to execute, in a circuit manner, at least a part of processing executed in the CPU or the like. The number of CPUs, MPUs, or ASIC circuits may be any number.

First, the configuration of the image scanning apparatus 2 is explained below. The image scanning apparatus 2 includes, as shown in FIG. 1, a document table 10, a light source 11, a first reflection mirror 12A, a second reflection mirror 12B, a first mirror 13, a first carriage 14, a second mirror 16, a third mirror 17, a second carriage 18, a condensing lens 20, a three-line CCD sensor 21, a CCD board 22, and a CCD control board 23.

An original document O is placed on the document table 10. The document table 10 may be, for example, glass. The light source 11 exposes the original document O placed on the document table 10 to light. The first reflection mirror 12A reflects light, which is emitted by the light source 11, to the second reflection mirror 12B. The second reflection mirror 12B reflects the light, which is reflected by the first reflection mirror 12A, to the document table 10. Details of the light source 11, the first reflection mirror 12A, and the second reflection mirror 12B located in the first carriage 14 are explained later.

The first mirror 13 leads light from a document surface to the second mirror 16. The first carriage 14 is equipped with the light source 11, a reflector 12, and the first mirror 13. The first carriage 14 moves in the sub-scanning direction of the document surface at predetermined speed (V).

The second mirror 16 and the third mirror 17 lead the light from the first mirror 13 to the condensing lens 20. The second carriage 18 is equipped with the second mirror 16 and the third mirror 17. The second carriage 18 moves in the sub-scanning direction at half speed (V/2) of the speed (V) of the first carriage 14. Since the second carriage 18 moves following the first carriage 14 at the half speed of the speed of the first carriage 14, a distance from a scanning position of the document surface to a light receiving surface of the three-line CCD sensor 21 is kept at fixed optical path length.

The light from the document surface is made incident on the condensing lens 20 via the first, second, and third mirrors 13, 16, and 17. The condensing lens 20 leads the incident light to the three-line CCD sensor 21 configured to convert the incident light into an electric signal. Specifically, the reflected light from the document surface is transmitted through the glass of the document table 10, sequentially reflected by the first mirror 13, the second mirror 16, and the third mirror 17, and focused on the light receiving surface of the three-line CCD sensor 21 via the condensing lens 20.

The three-line CCD sensor 21 includes a line sensor in which photoelectric conversion elements configured to convert light into an electric signal are arranged in a main scanning direction. The three-line CCD sensor 21 converts light from an original document into an electric signal including image signals of three colors that form a color image. For example, if the three-line CCD sensor 21 scans a color image in three primary colors of light including R (red), G (green), and B (blue), the three-line CCD sensor 21 includes an R line sensor 21R configured to scan an image of R (red), a G line sensor 21G configured to scan an image of G (green), and a B line sensor 21B configured to scan an image of B (blue).

The CCD board 22 includes a sensor driving circuit (not shown) for driving the three-line CCD sensor 21. The CCD control board 23 controls the CCD board 22 and the three-line CCD sensor 21. The CCD control board 23 includes a control circuit (not shown) configured to control the CCD board 22 and the three-line CCD sensor 21 and an image processing circuit (not shown) configured to perform processing of an image signal output from the three-line CCD sensor 21.

The configuration of the image forming section 3 is explained below. The image forming section 3 includes, as shown in FIG. 1, a sheet feeding section 30, a light scanning section 40 functioning as a light emitting section, first to fourth photoconductive drums 41a to 41d functioning as plural photoconductive members, first to fourth developing devices 43a to 43d functioning as developing sections, a transfer belt 45 functioning as a transferred section, cleaners 47a to 47d, a transfer device 49, a fixing device 51, a belt cleaner 53, and a stock section 55.

The light scanning section 40 emits laser beams (exposure lights) for forming latent images on the first to fourth photoconductive drums 41a to 41d. It is assumed that the first to fourth photoconductive drums 41a to 41d respectively correspond to three colors (Y, M, and C) that form a color image and black (K). The light scanning section 40 irradiates exposure lights corresponding to components of the colors in image data on the photoconductive drums 41a to 41d functioning as image bearing members for the respective colors. Electrostatic latent images corresponding to the intensities of the laser beams (the exposure lights) irradiated from the light scanning section 40 are formed on the photoconductive drums 41a to 41d. The first to fourth photoconductive drums 41a to 41d hold the formed electrostatic latent images, which are images of the respective colors.

The first to fourth developing devices 43a to 43d respectively develop, in specific colors, the latent images held by the photoconductive drums 41a to 41d. Specifically, the developing devices 43a to 43d supply toners of the respective colors to the latent images held by the photoconductive drums 41a to 41d, which correspond to the developing devices 43a to 43d, to thereby develop the images. For example, the image forming section 3 may obtain a color image using subtractive mixture of three colors yellow, magenta, and cyan. In this case, the first to fourth developing devices 43a to 43d visualize (develop) the latent images, which are held by the photoconductive drums 41a to 41d, in any of the colors yellow, magenta, cyan, and black. The first to fourth developing devices 43a to 43d store toners of any of the colors yellow, magenta, cyan, and black. The colors of the toners stored in the first to fourth developing devices 43a to 43d (the order for developing images of the respective colors) are determined according to an image forming process or characteristics of the toners. In this embodiment, it is assumed that the photoconductive drums 41a to 41d and the developing devices 43a to 43d respectively correspond to yellow (Y), magenta (M), cyan (C), and black (K).

The transfer belt 45 functions as an intermediate transfer member. Toner images of the respective colors formed on the photoconductive drums 41a to 41d are transferred onto the transfer belt 45 functioning as the intermediate transfer member in order. For example, the toner images on the photoconductive drums 41a to 41d carried to an intermediate transfer position are transferred onto the transfer belt 45 at an intermediate transfer voltage. Consequently, a color toner image obtained by superimposing the images of the four colors (yellow, magenta, cyan, and black) is formed on the transfer belt 45. The transfer device 49 transfers the toner image formed on the transfer belt 45 onto a transfer sheet. A misregistration sensor 26 is located on a downstream side in a conveying direction of the transfer belt 45 of the photoconductive drum 41d. Details of the misregistration sensor 26 are explained later.

The sheet feeding section 30 feeds a sheet, onto which the toner image is transferred from the transfer belt 45 functioning as the intermediate transfer member, to the transfer device 49. The sheet feeding section 30 feeds the sheet to a transfer position for the toner image by the transfer device 49 at appropriate timing. The sheet feeding section 30 includes plural cassettes 31, plural pickup rollers 33, plural separating mechanisms 35, plural conveying rollers 37, and an aligning roller 39.

The plural cassettes 31 respectively store sheets, which are media on which images are formed. The cassettes 31 can store sheets of arbitrary sizes up to a predetermined number of sheets. Each of the plural pickup rollers 33 picks up the sheets from a designated cassette 31 one by one. For example, as the cassette 31, a cassette indicated directly by a user is designated or a cassette in which sheets of an optimum size calculated according to a document size and magnification are stored is designated.

Each of the plural separating mechanisms 35 prevents two or more sheets from being picked up from the cassette 31 by the pickup roller 33 (separates the sheets one by one). The plural conveying rollers 37 convey the one sheet separated by the separating mechanism 35 to the aligning roller 39. The aligning roller 39 conveys the sheet to a transfer position, where the transfer device 49 and the transfer belt 45 are in contact with each other, according to timing when the transfer device 49 transfers the toner image from the transfer belt 45 (the toner image moves (in the transfer position)).

The fixing device 51 fixes the toner image on the sheet. For example, the fixing device 51 heats the sheet in a pressed state to thereby fix the toner image on the sheet. The fixing device 51 conveys the sheet subjected to the fixing to the stock section 55. The stock section 55 is a paper discharge section configured to discharge a sheet subjected to image formation processing (on which an image is printed). In the configuration example shown in FIG. 1, the stock section 55 is located in a space between the image scanning apparatus 2 and the image forming section 3.

The belt cleaner 53 cleans the transfer belt 45. The belt cleaner 53 is in contact with the transfer belt 45 in a predetermined position. The belt cleaner 53 removes a waste toner remaining on a transfer surface, onto which the toner image is transferred, on the transfer belt 45 from the transfer belt 45.

Figure 2:
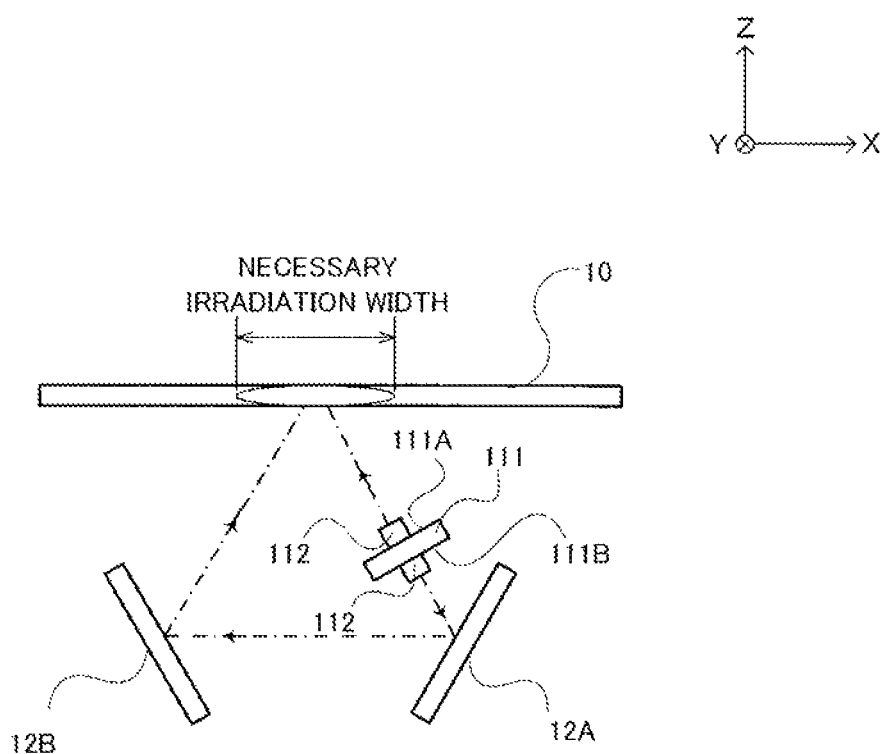
FIG. 2 is a diagram of the internal configuration of a first carriage.
Figure 3:
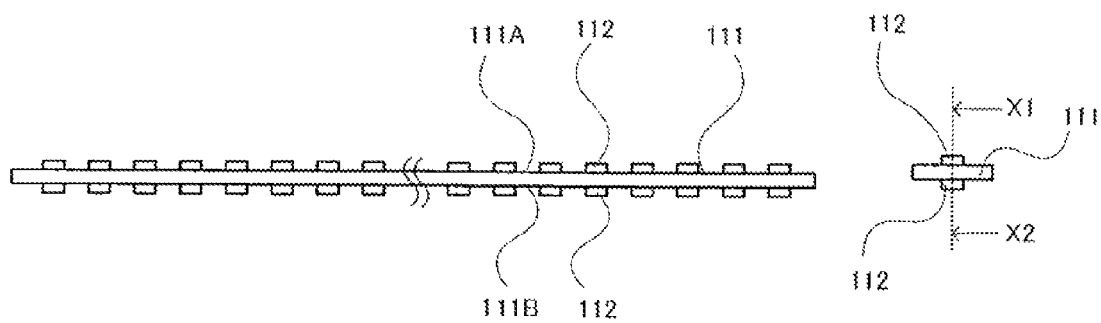
FIG. 3 is a sectional view of LED arrays taken along an X1-X2 section.

The configuration of the first carriage 14 of the image scanning apparatus 2 is explained in detail below. FIG. 2 is a diagram of the internal configuration of the first carriage 14. FIG. 3 is a sectional view of LED arrays taken along an X1-X2 section. The light source 11 includes a substrate 111 and LED arrays 112. The substrate 111 includes a component surface 111A and a solder surface 111B. The LED arrays 112 are located on both of the component surface 111A and the solder surface 111B. Since the LED arrays 112 are located on both the surfaces of the substrate 111, a temperature difference between the component surface 111A and the solder surface 111B decreases and a warp of the substrate 111 is suppressed. Further, efficiency of a space is realized. In this embodiment, the LED arrays 112 located on the component surface 111A and the solder surface 111B are light sources of a straight type that have the same light amount and irradiate light in the vertical direction of the substrate 111.

The LED array 112 (a first light emitting element) located on the component surface 111A irradiates the document table 10 with direct light. The LED array 112 (a second light emitting element) located on the solder surface 111B irradiates the document table 10 with indirect light reflected via the first reflection mirror 12A and the second reflection mirror 12B. In this way, the direct light and the indirect light diffused on the reflection mirrors 12A and 12B are irradiated on the document table 10. Therefore, a light amount necessary for image scanning is obtained.

Figure 4:
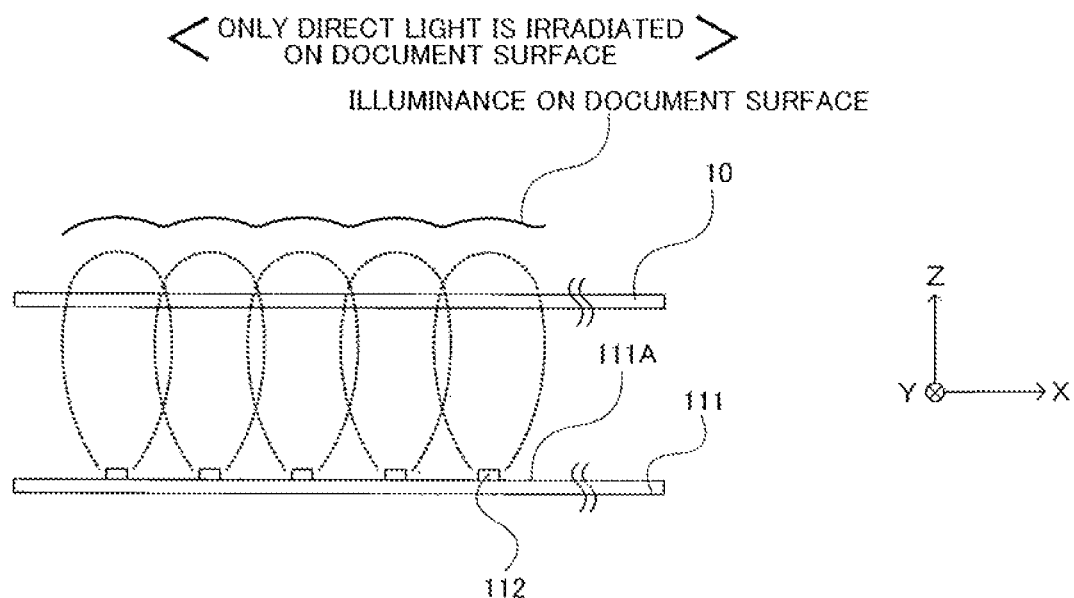
FIG. 4 is a schematic diagram formed by tracing direct light irradiated on a document table from an LED array located on a component surface.
Figure 5:
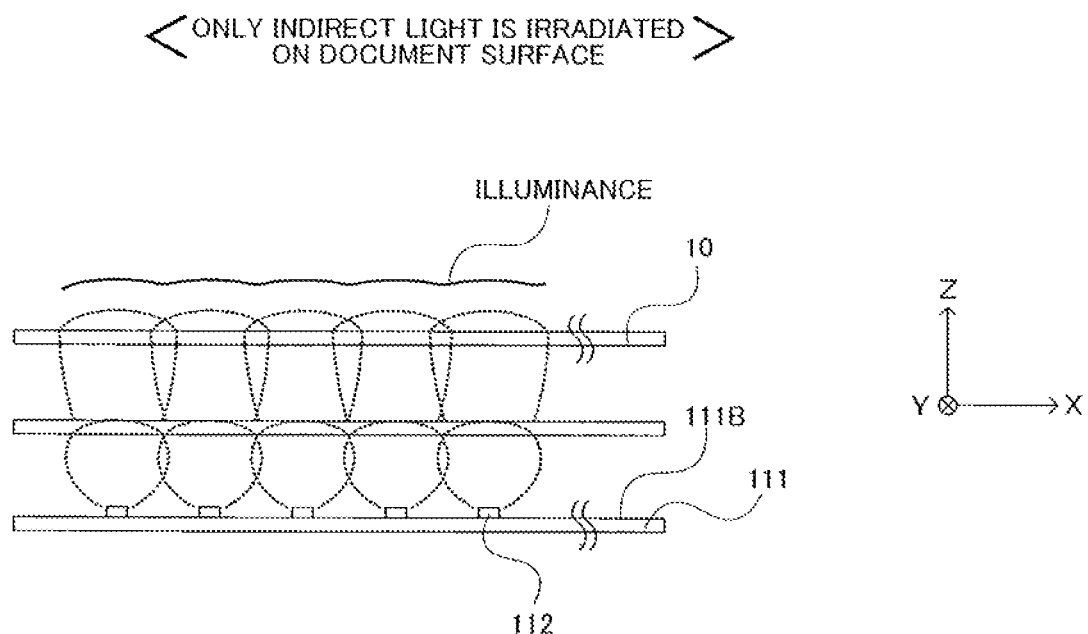
FIG. 5 is a schematic diagram formed by tracing indirect light irradiated on the document table from an LED array located on a solder surface via reflection mirrors.

FIG. 4 is a schematic diagram formed by tracing the direct light irradiated on the document table 10 from the LED array 112 located on the component surface 111A. FIG. 5 is a schematic diagram formed by tracing the indirect light irradiated on the document table 10 from the LED array 112 located on the solder surface 111B via the reflection mirrors 12A and 12B. However, only representative rays among rays irradiated from the LED arrays 112 are shown. Illuminance (intensity of light) on the document surface is indicated by a solid line.

Referring to these figures, an illuminance ripple occurs if the document table 10 is irradiated by only the direct light and by only the indirect light. However, the illuminance ripple is reduced by irradiating both of the direct light and the indirect light on the document table 10.

Second Embodiment

A second embodiment is different from the configuration of the first embodiment in that an image scanning apparatus includes a light-amount adjusting section for adjusting light amounts of the LED arrays 112 located on the component surface 111A and the solder surface 111B. Referring to FIG. 1, the light-amount adjusting section may be the controller 80. The controller 80 controls current values supplied to the LED arrays 112 to thereby control a light emission amount.

Figure 6:
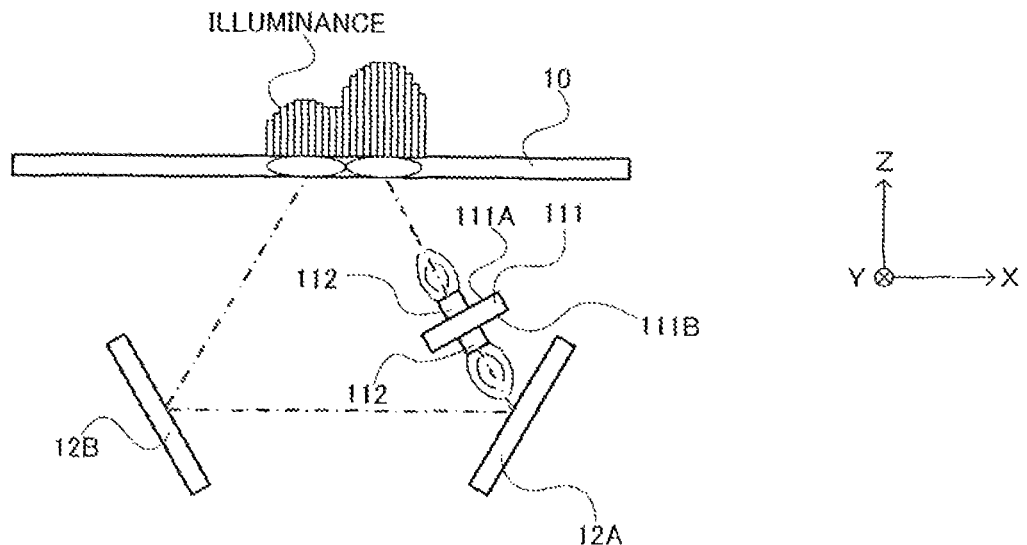
FIG. 6 is a schematic diagram of a light amount level on a document table of light irradiated on a component surface from an LED array (a second embodiment)
Figure 7:
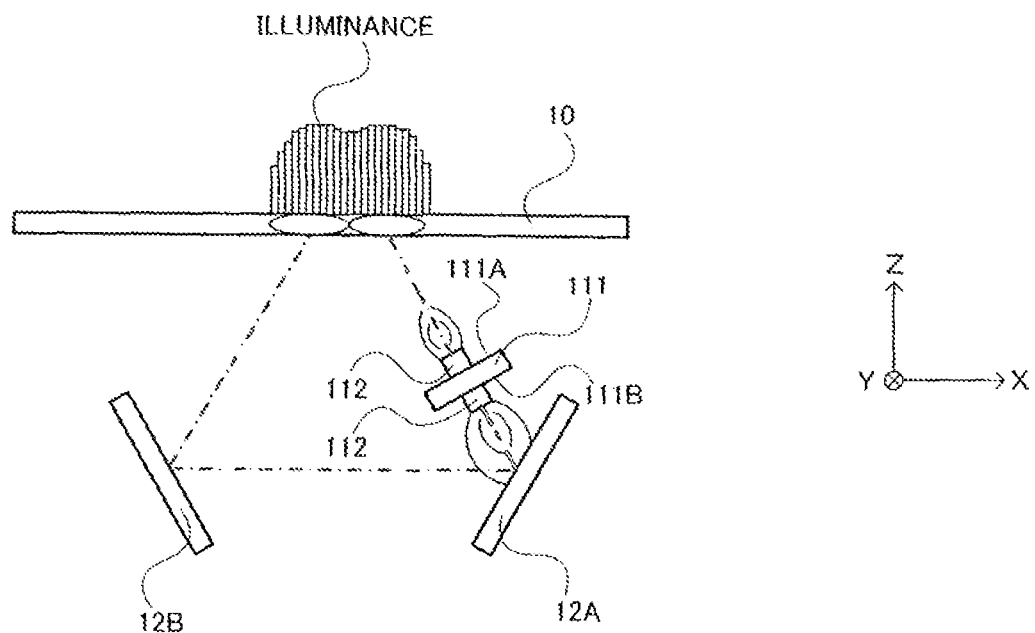
FIG. 7 is a schematic diagram of a light amount level on the document table of light irradiated on a solder surface from an LED array (the second embodiment)

FIGS. 6 and 7 are schematic diagrams of light amount levels on the document table 10. In a configuration shown in FIG. 6, all light amounts of the LED arrays 112 located on the component surface 111A and the solder surface 111B are the same. In a configuration shown in FIG. 7, a light amount of the LED array 112 located on the solder surface 111B is set relatively larger than a light amount of the LED array 112 located on the component surface 111A.

When optical path length of light irradiated on the document table 10 from the LED array 112 located on the solder surface 111B is represented as L1 and optical path length of light irradiated on the document table 10 from the LED array 112 located on the component surface 111A is represented as L2, L1 is larger than L2. The light irradiated on the document table 10 from the LED array 112 located on the solder surface 111B is indirect light reflected via the first reflection mirror 12A and the second reflection mirror 12B. The light irradiated on the document table 10 from the LED array 112 located on the component surface 111A is direct light.

Therefore, as shown in FIG. 6, a light amount of the light irradiated from the LED array 112 located on the solder surface 111B is smaller than a light amount of the light irradiated from the LED array 112 located on the component surface 111A. Fluctuation in light amount levels increases on the document table 10.

Therefore, as shown in FIG. 7, a light emission amount of the LED array 112 located on the solder surface 111B is set larger than a light emission amount of the LED array 112 located on the component surface 111A, whereby fluctuation in light amount levels of the direct light and the indirect light on the document table 10 is suppressed. Consequently, image scanning is executed using stable light sources having small fluctuation in light amount levels. The digital multifunction peripheral 1 acquires information concerning fluctuation in light amounts by executing test printing. Current values may be controlled on the basis of the acquired information.

In the second embodiment, the control of light amounts is performed by controlling current values output to the LED arrays 112. However, the control of light amounts may be performed by setting the current values to be the same values and changing the LED arrays 112 located on the solder surface 111B and the component surface 111A to types different from each other (changing design values concerning light amounts).

Third Embodiment

Figure 8:
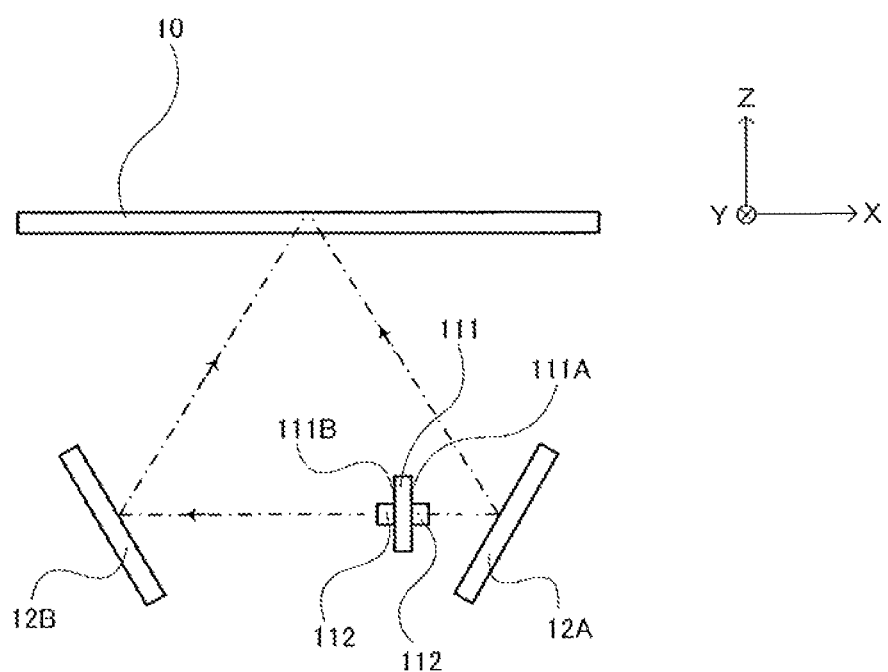
FIG. 8 is a diagram of the internal configuration of a first carriage according to a third embodiment.

FIG. 8 is a diagram of the configuration of the first carriage 14 according to a third embodiment. The third embodiment is different from the configuration of the first embodiment in that the light source 11 is located between the first reflection mirror 12A and the second reflection mirror 12B. The LED array 112 located on the component surface 111A irradiates the document table 10 via the first reflection mirror 12A. The LED array 112 located on the solder surface 111B irradiates the document table 10 via the second reflection mirror 12B. In this embodiment, lights irradiated from all the LED arrays 112 are made incident on the document table 10 as indirect lights. Therefore, compared with an optical system in the first embodiment including an optical path for irradiating direct light, a light amount decreases but an illuminance ripple is reduced.

Reflected light traveling from the document table 10 to the first mirror 13 (see FIG. 1) passes through a middle position between the first reflection mirror 12A and the second reflection mirror 12B. Therefore, the light source 11 needs to be provided in a position excluding the middle position. Consequently, optical path lengths of lights respectively reflected by the first reflection mirror 12A and the second reflection mirror 12B are different from each other. Therefore, as in the second embodiment, a reduction effect of an illuminance ripple may be increased by controlling the light amounts of the LED arrays 112 located on the component surface 111A and the solder surface 111B.

Fourth Embodiment

Figure 9:
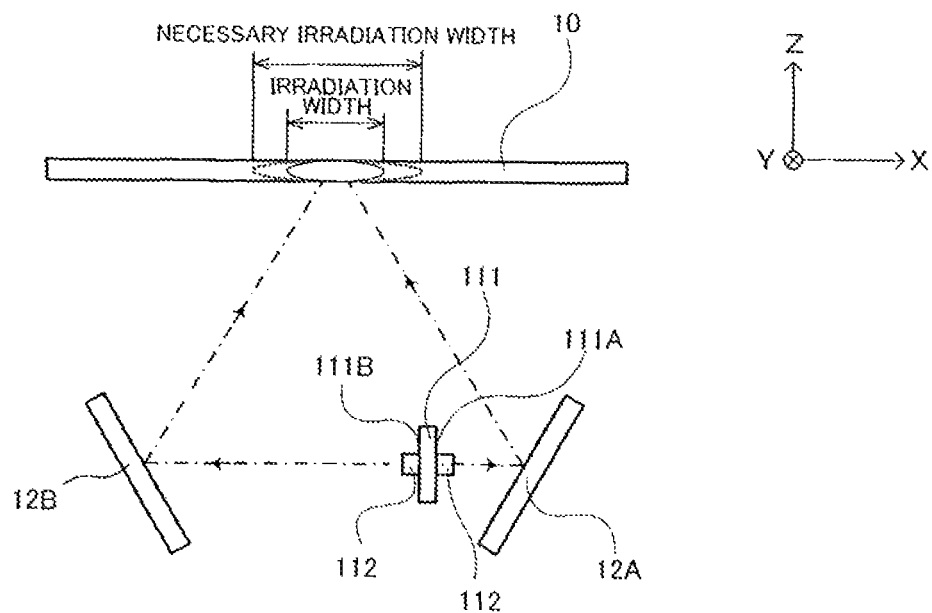
FIG. 9 is a diagram of the internal configuration of the first carriage according to the third embodiment.
Figure 10:
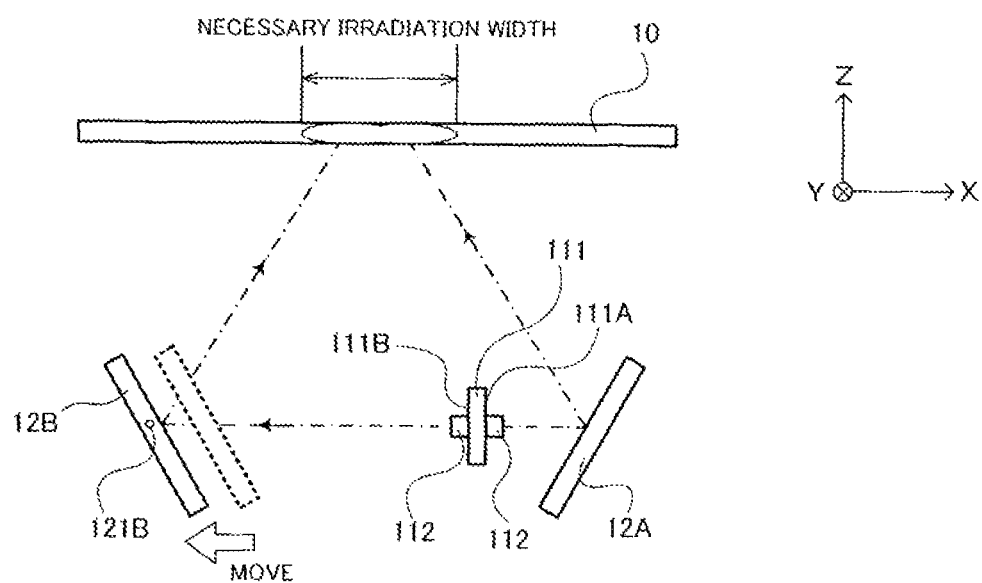
FIG. 10 is a diagram of the internal configuration of a first carriage according to a fourth embodiment.

FIG. 9 is a diagram of the internal configuration of the first carriage 14 according to the third embodiment. FIG. 10 is a diagram of the internal configuration of the first carriage 14 according to a fourth embodiment. The fourth embodiment is different from the configuration in the third embodiment in that the second reflection mirror 12B is movable.

Referring to FIG. 9, in the configuration in the third embodiment, in some cases, irradiation width by the LED array 112 located on the component surface 111A and irradiation width by the LED array 112 located on the solder surface 111B are narrower than necessary irradiation width. Therefore, when a thick paper document or the like is scanned by the image scanning apparatus 2, it is likely that a level difference portion appears as a shadow.

Referring to FIG. 10, the image scanning apparatus 2 according to the fourth embodiment includes a long hole extending in the horizontal direction (the X axis direction). The second reflection mirror 12B includes a pin 121B that can move along the long hole. The pin 121B moves along the long hole, whereby the position in the horizontal direction of the second reflection mirror 12B is adjusted.

The second reflection mirror 12B moves in the horizontal direction to separate from the first reflection mirror 12A, whereby the necessary irradiation width is secured. Consequently, the necessary irradiation width is secured without changing the light amounts of the LED arrays 112 and the directivity of the LED arrays 112.

In the fourth embodiment, the second reflection mirror 12B is movable. However, the first reflection mirror 12A may be movable or both the first reflection mirror 12A and the second reflection mirror 12B may be movable. A movable mechanism may be an adjusting mechanism for adjusting a reflection angle of the second reflection mirror 12B.

If the light source 11 is located on the tilt, irradiation width on the document table 10 also tilts. Therefore, it is likely that scanning is performed in a portion having low illuminance and a normal image is not obtained. On the other hand, according to the configuration in the fourth embodiment, the second reflection mirror 12B separates from the first reflection mirror 12A, whereby the irradiation width increases. Therefore, a more normal image is obtained.

Fifth Embodiment

Figure 11:
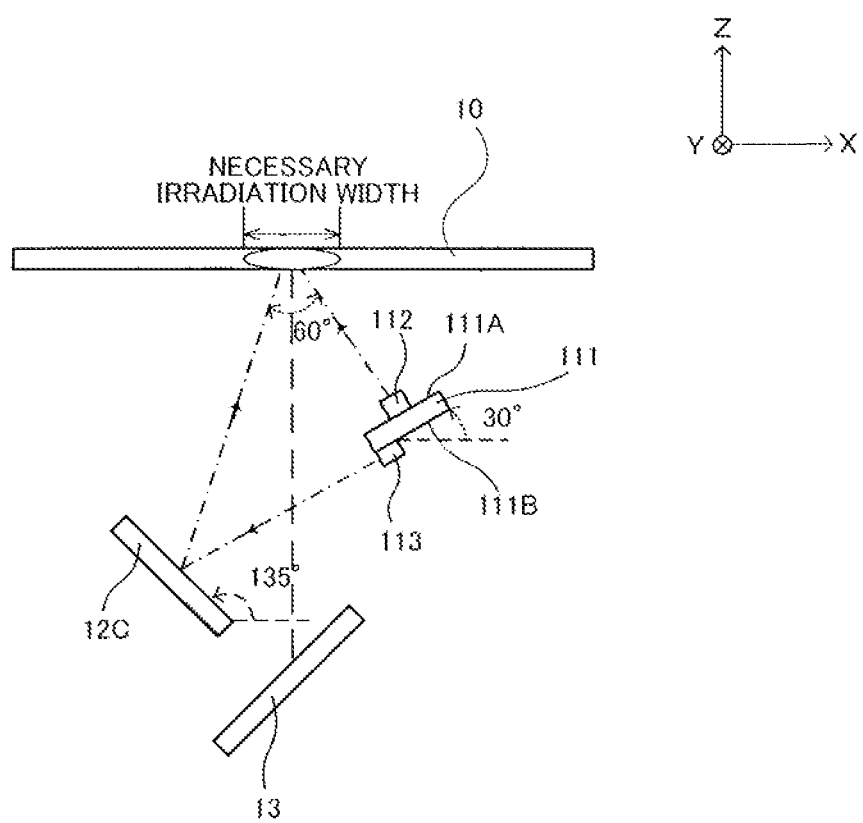
FIG. 11 is a diagram of the internal configuration of a first carriage according to a fifth embodiment.

FIG. 11 is a diagram of the internal configuration of the first carriage 14 according to a fifth embodiment. Components having functions same as those in the embodiments explained above are denoted by the same reference numerals and signs. Referring to FIG. 11, the substrate 111 includes the component surface 111A and the solder surface 111B. Plural LED arrays 112 (first light emitting elements) are located on the component surface 111A. Plural LED arrays 113 (second light emitting elements) are located on the solder surface 111B. The LED arrays 112 are LED arrays of a straight type that irradiate light in the thickness direction of the substrate 111. The LED arrays 113 are LED arrays of a right angle type that irradiate light in the plane direction of the substrate 111.

The LED arrays 112 irradiate the document table 10 with direct light. The LED arrays 113 irradiate the document table 10 with indirect light reflected by the reflection mirror 12C. The substrate 111 is located at an angle of 30 degrees with respect to the plane direction of the document table 10. The reflection mirror 12C are located at an angle of 135 degrees with respect to the plane direction of the document table 10. An angle formed by the direct light traveling from the LED arrays 112 to the document table 10 and the indirect light traveling from the reflection mirror 12C to the document table 10 is 60 degrees. However, these angles are examples and may be other angles as long as necessary irradiation width is secured.

The fifth embodiment is different from the configurations of the embodiments explained above in that only one reflection mirror is provided. Since the number of reflection mirrors 12 is reduced, cost is reduced. Further, since the number of times of reflection of the indirect light is reduced, attenuation of light is suppressed.

Figure 12:
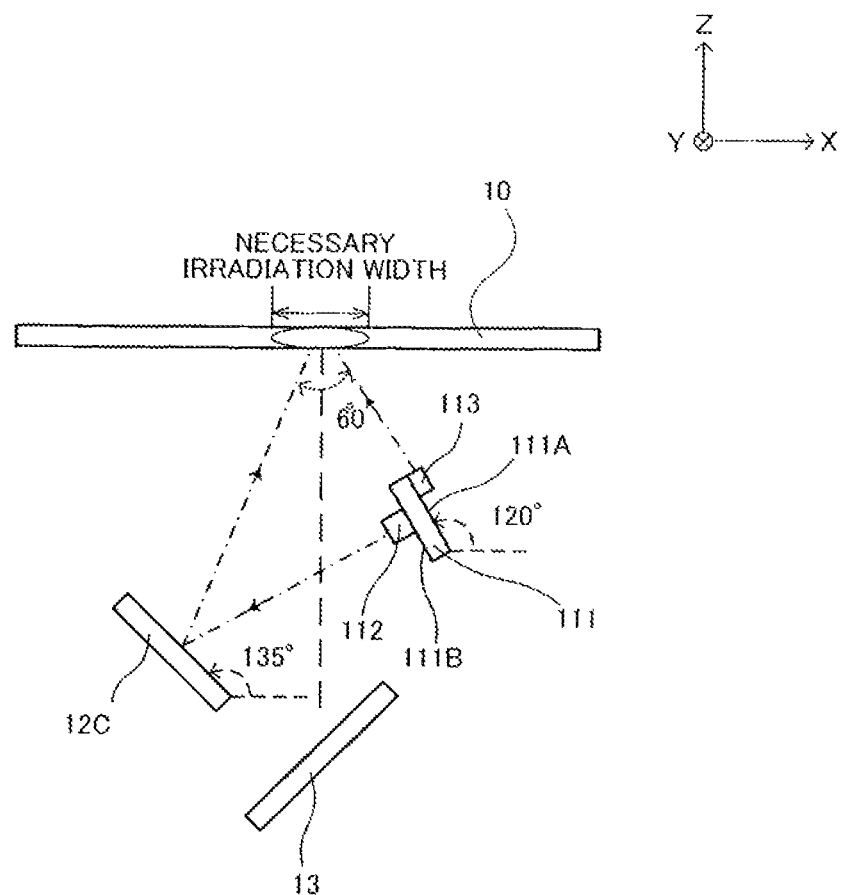
FIG. 12 is a modification of the fifth embodiment.

FIG. 12 is a diagram of a modification of the fifth embodiment and corresponds to FIG. 11. In this modification, the LED arrays 113 of the right angle type are located on the component surface 111A of the substrate 111 and the LED arrays 112 of the straight type are located on the solder surface 111B of the substrate 111. In this configuration, effects same as those in the fifth embodiment can be obtained.

Sixth Embodiment

A sixth embodiment is different from the fifth embodiment in configurations concerning a setting angle of the LED arrays 112 located on the component surface 111A and a positional relation between the LED arrays 112 and the LED arrays 113 in the plane direction of the substrate 111. The configuration of the first carriage 14 viewed from the Y axis direction is the same as that in the fifth embodiment shown in FIG. 11.

Figure 13:
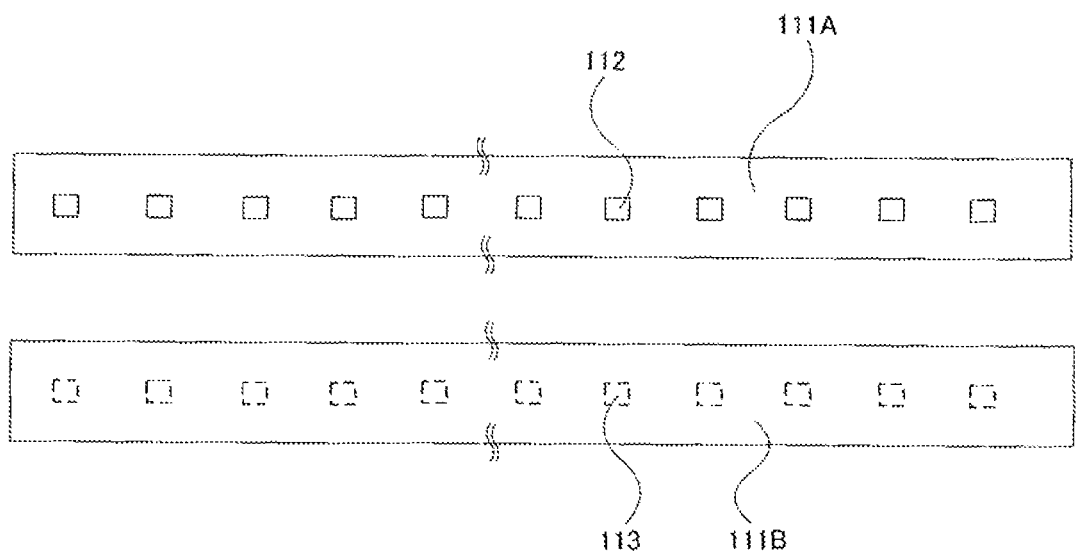
FIG. 13 is a plan view of a positional relation between LED arrays respectively located on a component surface and a solder surface in the fifth embodiment.
Figure 14:
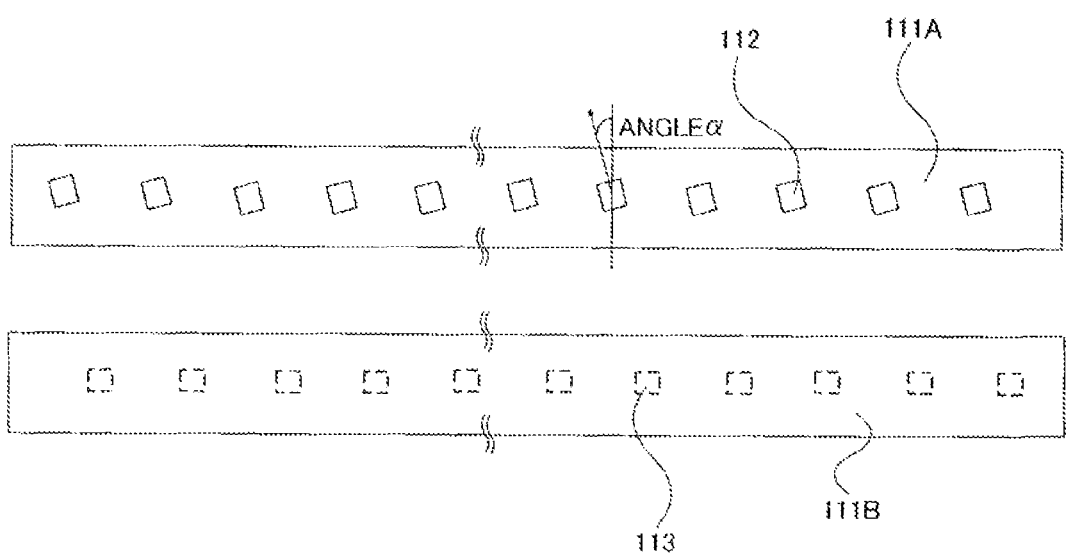
FIG. 14 is a plan view of a positional relation between LED arrays respectively located on a component surface and a solder surface in a sixth embodiment.

FIG. 13 is a plan view of a positional relation between the LED arrays respectively located on the component surface 111A and the solder surface 111B in the fifth embodiment. FIG. 14 is a plan view of a positional relation between LED arrays respectively located on the component surface 111A and the solder surface 111B in this embodiment.

Referring to FIG. 13, the LED arrays 112 located on the component surface 111A and the LED arrays 113 located on the solder surface 111B are opposed to each other in the thickness direction of the substrate 111. Therefore, since light phases of direct light irradiated by the LED arrays 112 and indirect light irradiated by the LED arrays 113 are the same, an illuminance ripple on the document table 10 is large. Since an optical path of the direct light is shorter than an optical path of the indirect light, the intensity of light on the document table 10 is relatively high. Therefore, the illuminance ripple on the document table 10 is larger.

Referring to FIG. 14, the LED arrays 112 located on the component surface 111A and the LED arrays 113 located on the solder surface 111B are located in positions not opposed to each other in the thickness direction of the substrate 111. In other words, the LED arrays 113 are located in positions corresponding to positions among LED arrays 112 adjacent to one another. Therefore, since the light phases of the direct light irradiated by the LED arrays 112 and the indirect light irradiated by the LED arrays 113 shift, the illuminance ripple on the document table 10 is relatively small. Further, the LED arrays 112 that irradiate the direct light tilts by an angle a with respect to the substrate 111 in a plane including the substrate 111. Since LEDs have directivity, illumination light having lower intensity is used as illumination light for scanning by arranging the LED arrays 112 on the tilt. Therefore, the intensity of the direct light on the document table 10 decreases and the illuminance ripple is further reduced.

Seventh Embodiment

A seventh embodiment is different from the configuration in the fifth embodiment in a positional relation between the LED arrays 112 and the LED arrays 113 in the plane direction of the substrate 111. The configuration of the first carriage 14 viewed from the Y axis direction is the same as the configuration in the third embodiment shown in FIG. 8.

Figure 15:
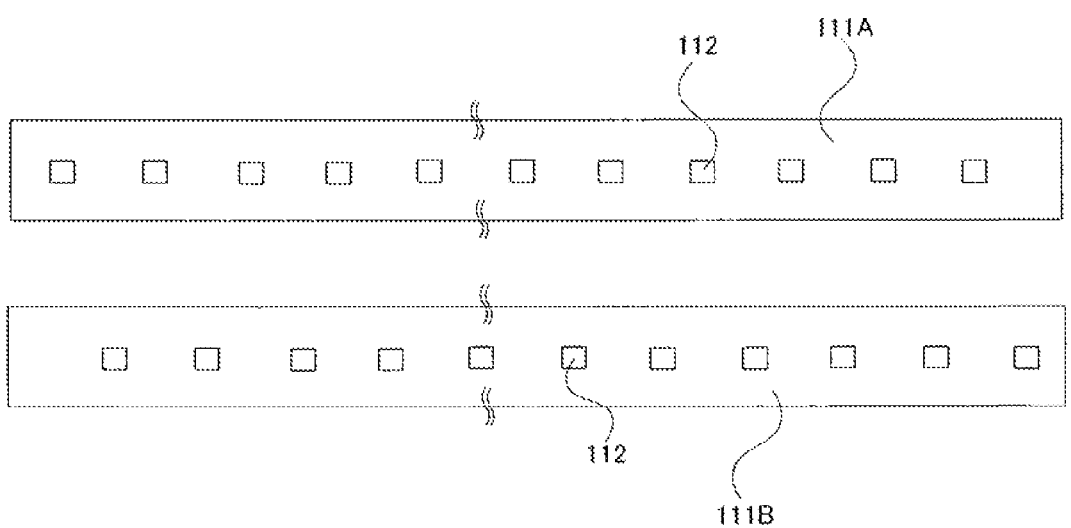
FIG. 15 is a plan view of a positional relation between LED arrays respectively located on a component surface and a solder surface in a seventh embodiment.

FIG. 15 is a diagram of a positional relation between LED arrays on the component surface 111A and the solder surface 111B in this embodiment. Referring to FIG. 15, the LED arrays 112 respectively located on the component surface 111A and the solder surface 111B are located in positions not opposed to each other in the thickness direction of the substrate 111. In other words, the LED arrays 112 located on the solder surface 111B are located in positions corresponding to positions among the LED arrays 112 adjacent to one another on the component surface 111A.

Therefore, since the light phases of direct light irradiated by the LED arrays 112 located on the component surface 111A and indirect light irradiated by the LED arrays 112 located on the solder surface 111B shift, an illuminance ripple on the document table 10 is relatively smaller than that in the configuration in the third embodiment. The configurations of the sixth and seventh embodiments may be applied to the other embodiments.

The present invention can be carried out in various forms without departing from the spirit and the main characteristics of the present invention. The embodiments explained above are merely examples in every aspect and should not be limitedly interpreted. The scope of the present invention is indicated by the scope of claims and is by no means restricted by the text of the specification. Further, all modifications and various improvements, substitutions, and alterations belonging to the scope of equivalents of the scope of claims are within the scope of the present invention.

What is claimed is:

1. An image scanning apparatus comprising:
   a document table on which an original document is stacked;
   a substrate;
   plural first light emitting elements located on one surface of the substrate, the first light emitting elements each emitting light for irradiating the original document on the document table with direct light not reflected by a reflection member; and
   plural second light emitting elements located on the other surface of the substrate, the second light emitting elements each emitting light for irradiating the original document on the document table with indirect light reflected by the reflection member, wherein
   an optical path of the direct light to the document table is shorter than an optical path of the indirect light to the document table, the reflection member includes a first reflection member and a second reflection member, and the first reflection member and the second reflection member are located in positions opposed to each other across a reflection optical path of light reflected by the original document on the document table.

2. The apparatus according to claim 1, wherein the second light emitting elements emit light having a light amount larger than a light amount of the first light emitting elements.

3. The apparatus according to claim 2, further comprising a light-amount adjusting section configured to change the light amounts by controlling current values output to the first light emitting elements and the second light emitting elements.

4. The apparatus according to claim 2, wherein, when the same current value is output to the first and second light emitting elements, an amount of light emitted by the first light emitting elements and an amount of light emitted by the second light emitting elements are different from each other.

5. The apparatus according to claim 1, wherein at least one of the first reflection member and the second reflection member includes a movable section configured to change an irradiation range on the document table.

6. The apparatus according to claim 5, wherein the second reflection member is moved along a sub-scanning direction of the apparatus with the movable section.

7. The apparatus according to claim 1, wherein the first light emitting elements and the second light emitting elements are located in positions not overlapping each other in a thickness direction of the substrate.

8. The apparatus according to claim 7, wherein
   the first light emitting elements and the second light emitting elements have directivity so as to have a direction of maximum light emission intensity,
   the first light emitting elements are arranged in a plane including the substrate at an angle with respect to a document table light irradiation direction so that the first light emitting elements irradiate the document table at less than the maximum light emission intensity, and
   the second light emitting elements are arranged in the plane including the substrate at zero angle with respect to the document table light irradiation direction so that the second light elements irradiate the document table at the maximum light emission intensity.

9. The apparatus according to claim 1, wherein
   the first light emitting elements and the second light emitting elements have directivity so as to have a direction of maximum light emission intensity,
   the first light emitting elements are arranged in a plane including the substrate at an angle with respect to a document table light irradiation direction so that the first light emitting elements irradiate the document table at less than the maximum light emission intensity, and
   the second light emitting elements are arranged in the plane including the substrate at zero angle with respect to the document table light irradiation direction so that the second light elements irradiate the document table at the maximum light emission intensity.

10. An image forming apparatus comprising:
an image scanning section including:
- a document table on which an original document is stacked;
- a substrate;
- plural first light emitting elements located on one surface of the substrate, the first light emitting elements each emitting light for irradiating the original document on the document table with direct light not reflected by a reflection member; and
- plural second light emitting elements located on the other surface of the substrate, the second light emitting elements each emitting light for irradiating the original document on the document table with indirect light reflected by the reflection member; and an image forming section configured to form an image on a sheet on the basis of image data generated by the image scanning section, wherein an optical path of the direct light to the document table is shorter than an optical path of the indirect light to the document table, the reflection member includes a first reflection member and a second reflection member, and the first reflection member and the second reflection member are located in positions opposed to each other across a reflection optical path of light reflected by the original document on the document table.

11. The apparatus according to claim 10, wherein the second light emitting elements emit light having a light amount larger than a light amount of the first light emitting elements.

12. The apparatus according to claim 11, further comprising a light-amount adjusting section configured to change the light amounts by controlling current values output to the first light emitting elements and the second light emitting elements.

13. The apparatus according to claim 11, wherein, when the same current value is output to the first and second light emitting elements, an amount of light emitted by the first light emitting elements and an amount of light emitted by the second light emitting elements are different from each other.

14. The apparatus according to claim 10, wherein at least one of the first reflection member and the second reflection member includes a movable section configured to change an irradiation range on the document table.

15. The apparatus according to claim 14, wherein the second reflection member is moved along a sub-scanning direction of the apparatus with the movable section.

16. An image scanning apparatus comprising:
- a document table on which an original document is stacked;
- a substrate;
- plural first light emitting elements located on one surface of the substrate, the first light emitting elements each emitting light for irradiating the original document on the document table in a vertical direction of the substrate; and
- plural second light emitting elements located on the other surface of the substrate, the second light emitting elements each emitting light for irradiating the original document on the document table in a plane direction of the substrate, wherein one of the first light emitting elements and second light emitting elements irradiate the original document on the document table with direct light not reflected by a reflection member, the other of the first light emitting elements and second light emitting elements irradiate the original document on the document table with indirect light reflected by the reflection member, an optical path of the direct light to the document table is shorter than an optical path of the indirect light to the document table, and the reflection member and the substrate are located in positions opposed to each other across a reflection optical path of light reflected by the original document on the document table.

* * * * *

UNITED STATES PATENT AND TRADEMARK OFFICE
CERTIFICATE OF CORRECTION

| | | |
|---|---|---|
| PATENT NO. | : 8,976,425 B2 | Page 1 of 1 |
| APPLICATION NO. | : 13/110689 | |
| DATED | : March 10, 2015 | |
| INVENTOR(S) | : Shiraishi et al. | |

It is certified that error appears in the above-identified patent and that said Letters Patent is hereby corrected as shown below:

On the title page item [73], delete "Toshiba TEC Kabushiki Kaisha" and insert --Kabushiki Kaisha Toshiba-- and --Toshiba TEC Kabushiki Kaisha-- therefor.

Signed and Sealed this
Sixteenth Day of February, 2016

Michelle K. Lee
*Director of the United States Patent and Trademark Office*